April 7, 1936.   N. S. FOCHT   2,036,623
HYDRAULIC SHOCK ABSORBER
Original Filed Feb. 21, 1935    3 Sheets-Sheet 2
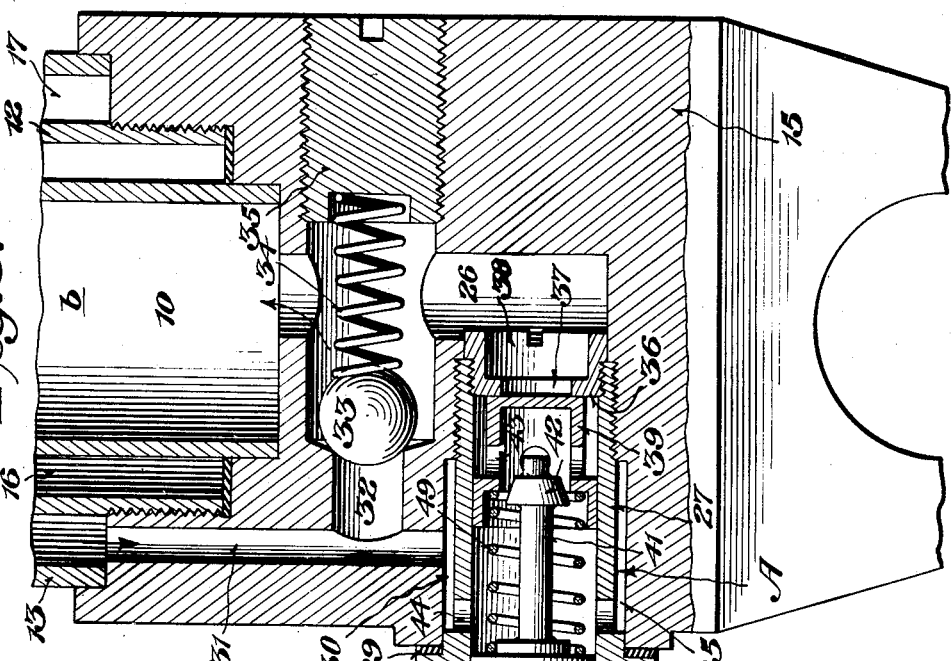
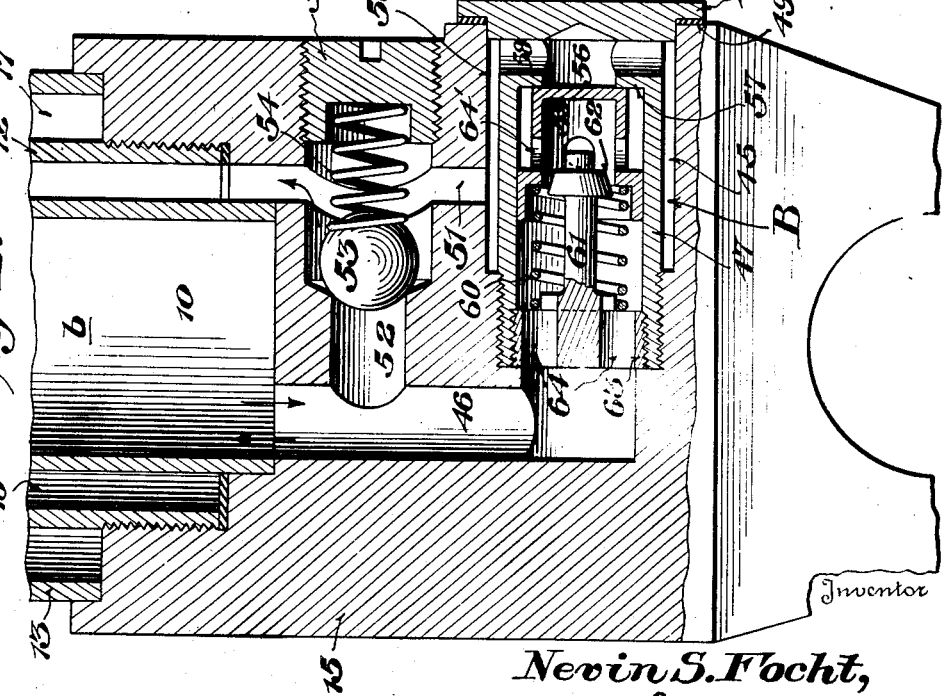
Inventor
Nevin S. Focht,
By D. P. Wolhaupter
Attorney April 7, 1936.  N. S. FOCHT  2,036,623
HYDRAULIC SHOCK ABSORBER
Original Filed Feb. 21, 1935  3 Sheets-Sheet 3
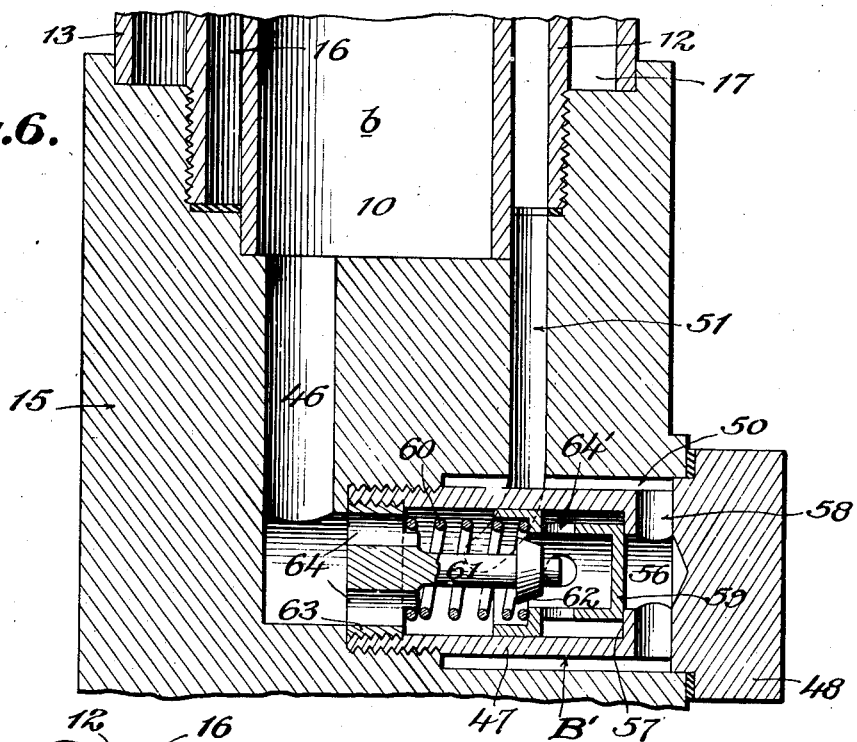
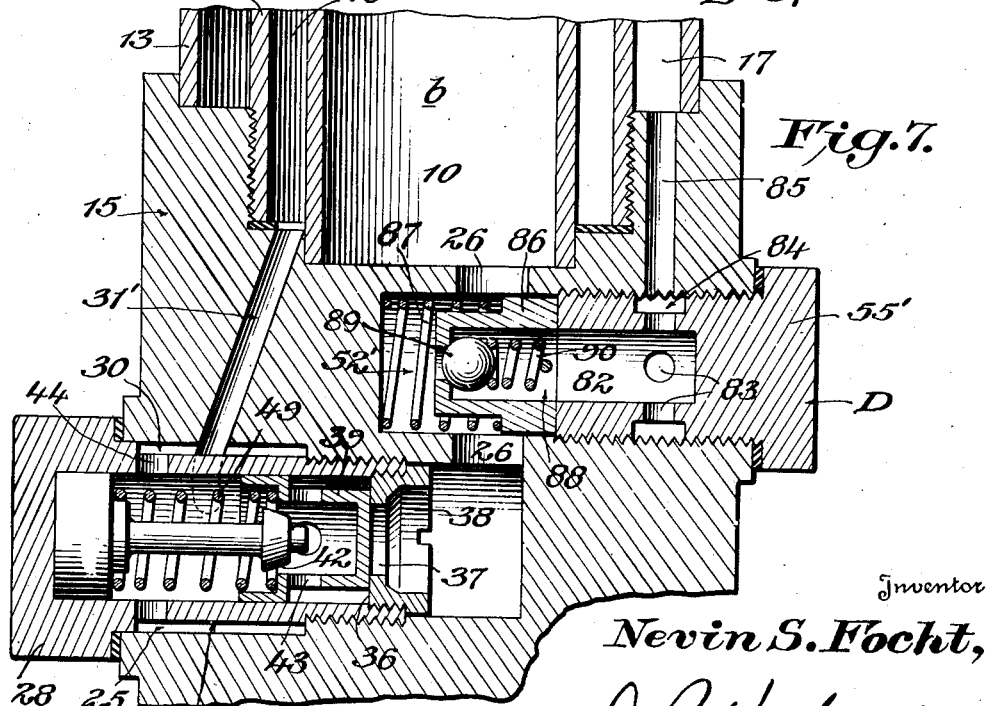
Inventor
Nevin S. Focht,
By D. P. Wolhaupter
Attorney Patented Apr. 7, 1936

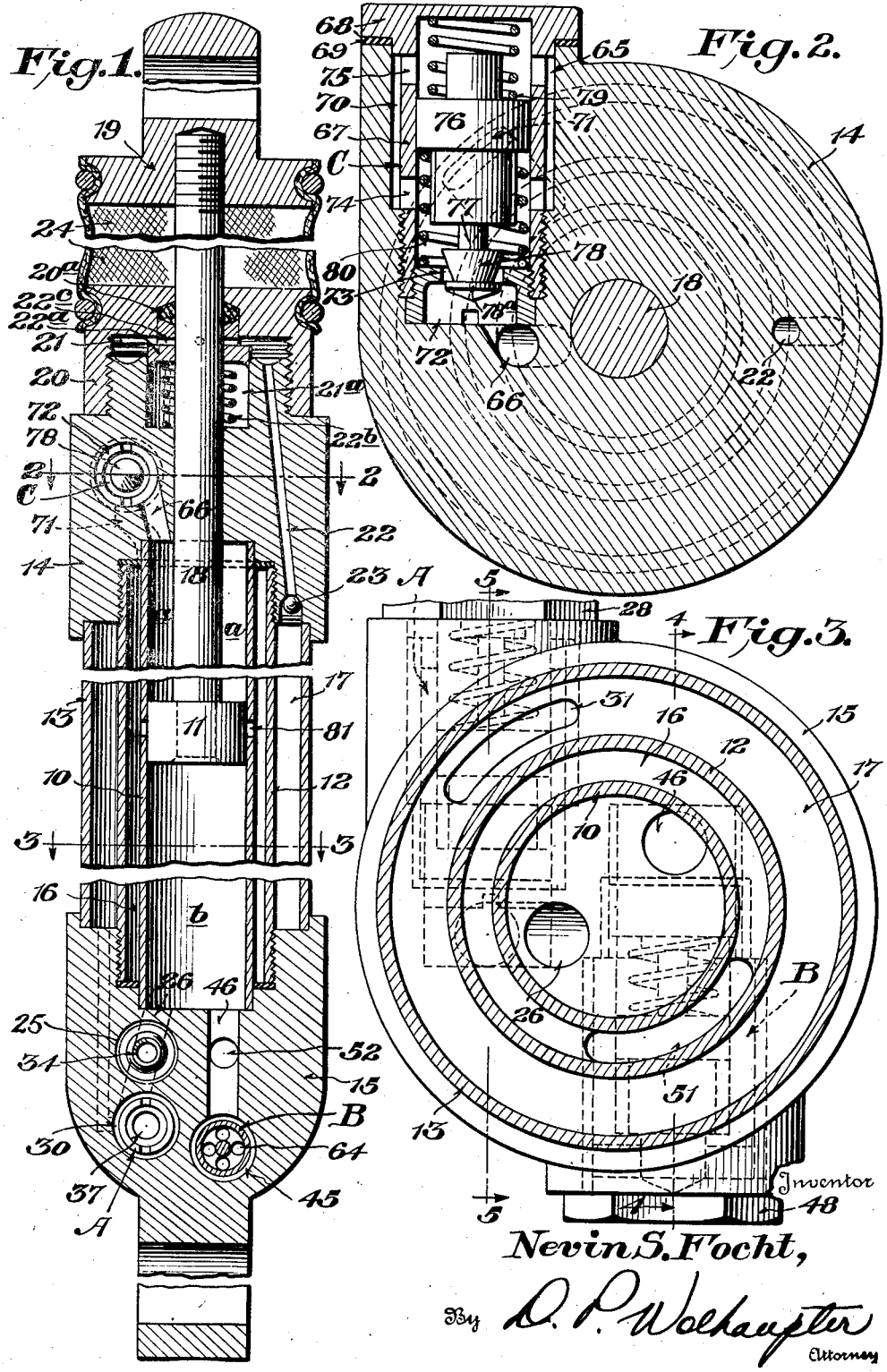

2,036,623

UNITED STATES PATENT OFFICE 2,036,623

HYDRAULIC SHOCK ABSORBER

Nevin S. Focht, Reading, Pa.

Application February 21, 1935, Serial No. 7,610
Renewed February 27, 1936

16 Claims. (Cl. 188—88)

This invention relates to shock absorbers for use on motor vehicles, airplanes, industrial machines and the like, and has generally in view to provide a hydraulic shock absorber, preferably but not necessarily of the strut type, operating on the general principle and possessing the principal advantages of the vane and strut type shock absorbers described and claimed in my prior Patent No. 1,957,452 dated May 8, 1934, and in my copending application, Serial No. 691,211.

A special object of the invention is to provide a shock absorber of the type mentioned which, as compared with the shock absorbers described and claimed in the aforesaid applications, is of considerably simplified construction, more readily and easily assembled and of lower production cost.

Another special object of the present invention is to provide a shock absorber of the type mentioned in which all of the liquid control valves are readily accessible from the outside of the shock absorber and may readily be removed for adjustment or other purposes and equally as readily replaced without disturbing other parts of the shock absorber.

Another special object of the present invention is to provide a shock absorber of the type mentioned having an exceptionally large liquid storage reservoir and further embodying in this connection a construction whereby the possibility of air pockets developing within the shock absorber during its operation is effectively eliminated.

Another special object of the invention is to provide a shock absorber of the character mentioned embodying a novel combination and arrangement of a minimum number of simple valves to assure desired control of shocks under all conditions and phases of operation of the shock absorber.

Another object of the invention is to provide novel means to assure effective purging of air from the pressure chambers of the shock absorber.

With the foregoing and other objects in view, which will become more fully apparent as the nature of the invention is better understood, the same consists in the novel features of construction, combination and arrangement of parts as will be hereinafter more fully described, illustrated in the accompanying drawings and defined in the appended claims.

In the drawings, wherein like characters of reference denote corresponding parts in the different views:—

Figure 1 is a central, longitudinal section through a shock absorber constructed in accordance with the invention.

Figure 2 is an enlarged cross-section on the line 2—2 of Fig. 1.

Figure 3 is an enlarged cross-section on the line 3—3 of Fig. 1.

Figure 4 is a section on the line 4—4 of Fig. 3.

Figure 5 is a section on the line 5—5 of Fig. 3; and

Figures 6 and 7 are sectional views similar to Figs. 4 and 5, respectively, illustrating another embodiment of the invention.

Referring to the drawings in detail, it will be observed that the present shock absorber, according to the practical embodiment thereof illustrated in the present instance, is of the general strut type design shown in my prior application, Serial No. 691,211, and includes a working cylinder 10 and a piston 11 for connection, respectively, with a pair of relatively movable elements such, for example, as the axle and the chassis of a motor vehicle.

The shock absorber may be disposed for operation either horizontally, or at an inclination to the horizontal, or vertically. In most instances it will be disposed vertically or substantially vertically. For purposes of the present description it will therefore be assumed to be disposed vertically.

Surrounding the cylinder 10 is a tube 12 which is of somewhat greater internal diameter than the external diameter of said cylinder. Similarly, a casing 13 of somewhat greater internal diameter than the external diameter of the tube 12 surrounds said tube. The cylinder, tube and casing are closed at their ends by upper and lower heads 14 and 15, respectively, the tube 12 in the present instance being threaded at its ends into said heads and the latter being provided with counter-bores receiving the ends of the cylinder 10 and the casing 13, whereby said heads and the cylinder, tube and casing are maintained rigidly in assembly with each other, with the cylinder, tube and casing disposed concentrically. Thereby, an annular liquid passageway 16 is provided between the cylinder 10 and the tube 12, and an annular liquid reservoir 17 is provided between the tube 12 and the casing 13.

The piston 11 is reciprocal within the cylinder 10 and its normal position is approximately midway between the heads 14 and 15, dividing the cylinder into upper and lower pressure chambers $a$ and $b$, respectively. Extending upwardly from said piston through the chamber $a$ and through a central bore in the head 14 is a piston rod 18 which, at its upper end, carries a combined closure cap and attachment element 19 for connection with one of the elements, such as the axle or chassis of a vehicle, movements of which are to be controlled by the shock absorber. The lower head 15 is suitably formed for connection with the other of the elements movements of which are to be controlled by the shock absorber.

Threaded onto the head 14 is a cap 20 which cooperates with said head to provide a chamber 21. The piston rod 18 may be packed or sealed in the same manner as illustrated and described in my copending application, Serial No. 691,211, so that any liquid which may escape from the cylinder 10 along the piston rod collects in said chamber 21 and escapes therefrom to the reservoir 17 through a duct 22 formed in the head 14. It has been found, however, that a more desirable arrangement is to provide for a small amount of more or less free flow of liquid from the pressure chamber $a$ along the piston rod 18 into the chamber 21 and to provide a tight seal preventing escape of liquid from said chamber 21 along the piston rod through the bore in the cap 20 through which the piston rod extends. Accordingly, a packing ring 20$^a$ of leather or other suitable material is disposed within a recess in the cap 20 in surrounding relationship to the piston rod 18 and below this gasket, also in surrounding relationship to the piston rod, and extending through the chamber 21 into a chamber 21$^a$ in the head 14, is disposed a follower 22$^a$ of any suitable material which is urged against the packing ring 20$^a$ by a spring 22$^b$ to maintain a tight sealing engagement of said packing ring with the piston rod. The follower 22$^a$ more or less loosely fits the piston rod so that liquid may flow more or less freely through the piston rod bore therein, and said follower is provided with one or more small ducts 22$^c$ for the outlet into the chamber 21$^a$ of liquid which escapes along the piston from the pressure chamber $a$. Any air contained within the operating chambers of the shock absorber always finds its way to the top of the liquid in an effort to escape therefrom. Consequently, any air which may remain in the pressure chambers of the shock absorber when the same is charged with liquid, or which may be contained within the liquid, soon escapes with the liquid along the piston rod into the chamber 21$^a$ and from said chamber by way of chamber 21 through the duct 22 into the reservoir 17 where it does not affect the operation of the shock absorber due to the relatively large capacity of said reservoir and to the fact that the same need not be entirely filled with liquid. As aforesaid, the amount of liquid which may escape along the piston rod is relatively small so that such escape of liquid does not in any appreciable way affect the shock absorbing functions of the shock absorber. Moreover, since only a small amount of liquid escapes along the piston rod and since this liquid may return to the reservoir 17 as rapidly as it enters the chamber 21$^a$, said chamber never is subjected to high pressure. The packing ring 20$^a$ therefore serves effectively to prevent flow of liquid along the piston rod through the bore in the cap 20 through which the piston rod extends. On the other hand, the presence of oil within the chamber 21$^a$ and surrounding the piston rod where said rod extends through the bore in the head 14, serves effectively as a seal to prevent sucking back into the pressure chamber $a$ of air which has been purged from said pressure chamber. Thus, the present shock absorber always is self-purging of air and therefore is devoid of those objectionable features of operation of prior shock absorbers which are directly traceable to air pockets affecting the operation of the valves and other parts thereof. A check valve 23 preferably is provided to permit flow of liquid from the chamber 21 to the reservoir 17 and to prevent reverse flow of the liquid.

A boot 24 of leather or other suitable material is disposed in surrounding, protective relationship to the piston rod 18 between the cap elements 19 and 20 and is fastened at its ends to said elements, as illustrated and described in my said copending application, Serial No. 691,211.

The lower head 15 is provided with a horizontal bore 25 which opens at its outer end through the side of said head and at its inner end into the bottom portion of a vertical duct 26 which, at its upper end, opens into the bottom of the cylinder 10. The inner end portion of the bore 25 is of reduced diameter and is threaded and receives the inner, threaded end of a valve, designated generally as A, including cylindrical valve casing 27 having a head 28 which seals, through a gasket 29, against the outer face of the head 15. The said valve casing, between its ends, thus is surrounded by a space 30 which is in communication with the reservoir 17 through a duct 31 formed in the head 15.

Above the bore 25 the ducts 26, 31 are connected by a duct or passageway 32 which is controlled by a check valve 33, said valve being arranged to close in the direction of the duct 31 and to open in the direction of the duct 26 so that liquid cannot escape from the cylinder 10 to the reservoir 17 but may flow from said reservoir to said cylinder. A spring 34 interposed between the valve 33 and a plug 35 threaded into the head 15 maintains said valve normally seated, the plug being exposed at the side of the head so that it may readily be removed whenever desired to permit removal of said valve.

The inner end of the valve casing 27 is suitably shouldered as indicated at 36 and provided with an opening 37, a centrally bored plug 38 being threaded into the inner end of said valve casing, for example, to provide said shoulder and opening. Longitudinally slidable within said valve casing is a hollow spool valve 39 the outer end portion of which snugly engages the casing and the inner end portion of which is of reduced external diameter. This spool valve is closed at its inner end and is open at its outer end, and by a coil spring 40 is urged constantly inward to its innermost limit of movement in which its closed inner end seats against the shoulder 36 and closes the opening 37.

Carried by and extending inwardly from the head 28 of the valve casing 27 is a pin 41 having at its inner end an inwardly tapered head 42 the greatest diameter of which is slightly less than the internal diameter of the inner end portion of the spool valve 39. When the spool valve is at its limit of inward movement seating against the shoulder 36, the outer end portion of greatest diameter of the head 42 is disposed somewhat outwardly of the outer end portion of the inner, reduced internal diameter portion of the spool valve. Formed through the reduced, inner end portion of the spool valve is an opening or openings 43 providing communication between the interior of said valve portion and the annular space surrounding the same, while formed through the valve casing 27 near its outer end is an opening or openings 44 providing communication between the interior of said valve casing and the annular space 30 surrounding the same.

Formed in the head 15 is a second horizontal bore 45 which opens at its outer end through the side of said head and at its inner end into the bottom portion of a second vertical duct 46 which, at its upper end, opens into the bottom of the cylinder 10. The inner end portion of the bore 45 is of reduced diameter and is threaded and receives the inner, threaded end of a cylindrical valve casing 47 of a second valve designated generally as B, said casing 47 having a head 48 which seals, through a gasket 49, against the outer face of the head 15. The said valve casing between its ends thus is surrounded by a space 50 which is in communication through a duct 51 with the liquid passageway 16 between the cylinder 10 and the tube 12.

Above the bore 45 the ducts 46 and 51 are connected by a duct or passageway 52 which is controlled by a check valve 53, said valve being arranged to close in the direction of the duct 46 and to open in the direction of the duct 51. A spring 54 interposed between the valve 53 and a plug 55 threaded into the head 15 maintains said valve normally seated, the plug being exposed at the side of the head so that it is readily removable to permit access to or removal of said valve.

The head 48 of the valve casing 47 is relatively thick and is provided with a central bore 56 which opens into the interior of said valve casing and which is surrounded by a shoulder 57 defining the outer end of the bore of said casing. Ducts 58 afford communication between the bore 56 and the annular space 50 surrounding said valve casing 47.

Longitudinally slidable within the valve casing 47 is a hollow spool valve 59 the inner end portion of which snugly engages the casing and the outer end portion of which is of reduced external diameter. This spool valve is closed at its outer end and is open at its inner end and by a coil spring 60 is urged constantly outward to a position in which its closed outer end seats against the shoulder 57 and closes the bore 56.

Suitably carried by and extending outwardly from the inner end portion of the valve casing 47 is a pin 61 having at its outer end an outwardly tapered head 62 the greatest diameter of which is slightly less than the internal diameter of the outer end portion of the spool valve 59. When the spool valve is at its limit of outward movement seating against the shoulder 57, the inner end portion of greatest diameter of the head 62 is disposed somewhat inwardly of the inner end portion of the reduced internal diameter portion of the spool valve. In the present instance the pin 61 is carried by a plug 63 which is threaded into the inner end of the valve casing 47 and which is bored as indicated at 64 to provide constant communication between the inner end portion of said valve casing and the duct 46. In the spool valve 59 is an opening or openings 64' which provide communication between the interior of said valve and the annular space surrounding the inner end portion thereof.

Formed in the upper head 14 is a horizontal bore 65 which, at its inner end, is in communication with the top of the cylinder 10 through a duct 66, and which, at its outer end, opens through the side of said head. The inner end portion of this bore 65 is of reduced diameter and is threaded and receives the inner, threaded end of a cylindrical valve casing 67 of a third valve designated generally as C, said casing 67 having a head 68 which seals, through a gasket 69, against the outer face of the head 14. The said valve casing, between its ends, thus is surrounded by a space 70 which is in communication with the liquid passageway 16 through a duct 71 formed in the head 14.

Threaded into the inner end of the valve casing 67 is a plug 72 having a central opening 73 through which communication is had between the inner end portion of said valve casing and the duct 66, while formed through the side of said valve casing 67 near its inner and outer ends are openings 74 and 75, respectively, which provide communication between the inner and the outer end portions, respectively, of said valve casing and the annular space 70 surrounding the same.

Reciprocal within the valve casing 67 between the openings 74, 75, is a piston 76 which, at its inner end carries a pin 77 having an inwardly tapered head 78 the greatest diameter of which is slightly less than the diameter of the opening 73. A spring 79 interposed between the head 68 and the piston 76 tends constantly to urge said piston inwardly, and a spring 80 interposed between the plug 72 and said piston tends constantly to urge said piston outwardly, said springs cooperating to maintain said piston normally in a position approximately midway between the openings 74, 75 with the tapered head 78 disposed partially within the opening 73. Preferably the inner or smaller end of the tapered head 78 terminates in a circular flange or enlargement 78ª which is of only slightly less diameter than the opening 73 and which substantially closes said opening when the head 78 is in its normal position substantially as shown in Fig. 2. The valve constituted by the tapered head 78, instead of permitting practically free flow of liquid through the opening 73 at the beginning of any period of operation of said valve, as would be the case if the flange or enlargement 78ª were omitted, manifestly is pressure operated at the start of any period of operation, which provides for smoother action of the shock absorber as affected in its operation by said valve.

Formed through the cylinder 10 substantially midway between the ends thereof is an opening or openings 81 which is or are covered by the piston 11 when the latter is in its normal position substantially midway between the ends of the cylinder and which are uncovered when said piston is moved either downwardly or upwardly from its normal position.

Assuming that the shock absorber is charged with oil or other liquid filling the cylinder 10 and the passageway 16 and partially filling the reservoir 17, and that the shock absorber is interposed between the axle and the spring supported chassis or body of a motor vehicle, for example, it has four distinct phases of operation; viz., (1), compression above normal as when an obstruction in the roadway is encountered and the cylinder 10 is moved upwardly relative to the piston 11; (2), rebound above normal or downward movement of the cylinder relative to the piston following compression above normal; (3), rebound below normal as when a depression in the roadway is encountered and the cylinder moves downwardly relative to the piston; and, (4), compression below normal or upward movement of the cylinder relative to the piston following rebound below normal.

As compression above normal occurs, the piston 11 and the head 15 move toward each and as soon as this movement is initiated the liquid below the piston within the chamber b is subjected to pressure. The check valve 33 obviously remains closed and the check valve 53 opens, permitting flow of liquid from the bottom of the cylinder 10 through the ducts 46 and 52 into the passageway 16 and through the openings 81, uncovered by the relative movement of the cylinder and piston, into the cylinder space or chamber a above the piston. Because of the presence of the piston rod 18 in the chamber a said chamber is of less capacity than the chamber b. Consequently, upon movement of the piston 11 and the head 15 toward each other, more liquid is forced from the chamber b than can be accommodated by the chamber a. The only avenue of escape for the surplus liquid obviously is through duct 26, the valve casing 27 and the duct 31 into the reservoir 17. The pressure of the liquid against the closed end of the spool valve 39 results in said valve being moved outwardly with consequent flow of the surplus liquid through the opening 37 into the space surrounding the inner end portion of said spool valve, through the openings 43 in the spool valve to the interior thereof, thence around the tapered head 42 into the casing 27, from said casing through the openings 44 therein into the space 30 and from said space through the duct 31 into the reservoir 17. As the spool valve 39 is moved outwardly the space between the tapered head and the interior of said spool valve diminishes. Consequently, free relative movement of the piston 11 and the head 15 toward each other is permitted initially, but thereafter the flow of the liquid is throttled by the metering head 42 so that the shock is gradually and effectively absorbed, this obviously holding true no matter how suddenly or severe the shock may be.

The second phase of operation, "rebound above normal", occurs following "compression above normal" and results from the compressed vehicle springs acting to move the piston and the head 15 relatively apart after the obstruction in the roadway has been passed. At the beginning of this phase of operation the piston 11 is presumed to be disposed within the chamber b below the openings 81. Under such conditions, as the piston 11 and the head 14 move toward each other, the liquid above the piston within the chamber a is subjected to pressure and flows from said chamber a through the openings 81 into and through the passageway 16 to the duct 51, being prevented from directly entering the bottom of the cylinder 10 through the ducts 52 and 46 by the check valve 53 and being required, therefore, to flow to the bottom of the cylinder 10 through the valve casing 47. The pressure produced in the passageway 16, duct 51, space 50, ducts 58 and bore 56 results in the spool valve 59 being moved outwardly, whereupon the liquid is permitted to flow into the space surrounding the outer end portion of the spool valve 59, through the openings 64' into the interior of said valve, around the tapered head 62 into the cylinder 47, and thence into and through the duct 46 to the bottom of the cylinder 10. The valve in the head 14 does not function during this phase of operation because the pressure is balanced to either side of the piston 76. Since the chamber a is of less capacity than the chamber b, not enough liquid is forced from the chamber a during "rebound above normal" to fill the chamber b. Consequently, the check valve 33 opens and enough liquid is drawn from the reservoir 17 through the ducts 31, 32 and 26 to compensate for the greater capacity of the chamber b. The spool valve 39 remains inoperative because it closes in the direction of the bottom of the cylinder 10. The spool valve 59 and the tapered head 62 cooperate during the rebound above normal phase of operation to control the flow of the liquid in the same manner that the spool valve 39 and the tapered head 42 cooperate to control the flow of the liquid during the compression above normal phase of operation, so that rebound above normal shocks are gradually and effectively absorbed.

The third phase of operation, "rebound below normal", occurs when the piston 11 is in its normal position approximately midway between the ends of the cylinder 10 and when, for example, there is encountered a depression in the roadway. When the vehicle wheels drop into the depression the axle and chassis move apart with the result that the piston 11 and the head 14 move relatively toward each other. Pressure therefore is generated in the cylinder space or chamber a above the piston 11 with the result that the liquid flows through the duct 66, through the opening 73 around the tapered head 78 into the valve casing 67, from said casing through the openings 74 into the annular space 70, from said space through the duct 71 to the passageway 16 and from said passageway through the uncovered openings 81 into the cylinder space or chamber b below the piston 11. Depending upon the suddenness of the movement of the piston 11 and the head 14 toward each other and therefore upon the amount of pressure generated, the piston 76 is moved more or less outwardly against the spring 79 so that the effective area of the space between the head 78 and the wall defining the opening 73 is varied to throttle the flow in a manner to gradually and effectively absorb any shock incident to the "rebound below normal" phase of operation. In this connection, due to the openings 74, 75 being located at opposite ends of the piston 76, it is apparent that said piston is subjected at opposite ends thereof to equal or balanced pressures so that the amount of movement of said piston to open or close the valve constituted by the tapered head 78 is directly proportioned to the pressure generated. Since not enough liquid is forced from the chamber a to fill the chamber b during movement of the piston 11 and the head 14 toward each other, the check valve 33 opens and liquid in sufficient quantity to maintain the chamber b filled is drawn from the reservoir 17 through the ducts 31 and 32.

The fourth phase of operation, "compression below normal", occurs following "rebound below normal" and results in part from the distended vehicle springs acting to move the vehicle axle and chassis toward each other and in part to the vehicle wheels leaving the depression and tending to force the axle upwardly relative to the chassis. At the beginning of this phase of operation the piston 11 is presumed to be disposed within the chamber a above the openings 81. Under such conditions, as the piston 11 and the head 15 are moved toward each other the liquid below the piston within the chamber b is subjected to pressure and flows from said chamber b through the openings 81 into and through the passageway 16 to and through the duct 71 to the space 70 surrounding the valve casing 67, thence into said valve casing through the openings 74, 75 and from said valve casing around the tapered head 78 and through the opening 73 to and through the duct 66 to the space or chamber $a$ above the piston 11, the flow being metered by the tapered head 78 cooperating with the wall surrounding the opening 73 so that return of the piston 11 to its normal position following the rebound below normal phase of operation is gradual and results in the shock being effectively absorbed. Since, during the compression below normal phase of operation, more liquid is forced from the chamber $b$ than can be accommodated by the chamber $a$, the spool valve 39 opens and surplus liquid flows around and through said valve to the reservoir 17.

In Figures 6 and 7 of the drawings is illustrated an embodiment of the invention in which the general shock absorber construction and mode of operation is similar to the embodiment of the invention illustrated in Figs. 1 to 5 and described in the foregoing, but wherein a somewhat different valve combination is utilized to control the flow of the liquid.

Referring to Figs. 6 and 7, it will be observed that the valves A', B' are the same as the valves A and B, respectively, of the Figs. 1 to 5 embodiment of the invention, but that the check valves 33 and 53 of the first form of the invention are eliminated in favor of a single valve D of novel construction, and that a different arrangement of ducts is provided for the flow of the liquid under the control of said valves A', B' and D, it being understood, of course, that the upper part of the shock absorber, including the valve C, remains as illustrated in Figs. 1 and 2.

Referring more particularly to Figs. 6 and 7, wherein the same reference characters are, for the sake of simplicity, employed to designate parts which in no way differ from corresponding parts illustrated in the Figs. 1 to 5 embodiment of the invention, it will be observed that the space 30 surrounding the casing 27 of the valve A' is not in communication with the reservoir 17 as in the Figs. 1 to 5 embodiment of the invention, but, on the contrary, is in communication with the liquid passageway 16 through a duct 31'; that this duct 31' does not communicate with the bottom of the cylinder 10 through a check valve controlled passageway as in the Figs. 1 to 5 embodiment of the invention, and that the space 50 surrounding the casing 47 of the valve B' is in communication with the liquid passageway 16 through a duct 51 as in the Figs. 1 to 5 embodiment of the invention, but that said duct 51 is not in communication with the bottom of the cylinder 10 through a check valve controlled passageway as in the Figs. 1 to 5 embodiment of the invention.

Further, it will be observed that the valve D comprises a plug 55' which is threaded into and closes the outer end portion of a horizontal bore 52' in the head 15; that the bore 52' intersects the duct 26 through which communication is afforded between the bottom of the cylinder 10 and the inner end of the valve A'; that the plug 55' is provided with a bore 82 closed at its outer end and opening at its inner end through the inner end of said plug; that openings 83 provide communication between said bore 82 and an annular channel 84 surrounding the plug 55'; that said channel, and consequently the bore 82, is in communication with the reservoir 17 through a duct 85 formed in the head 15; that slidable within the inner end portion of the bore 52' is a spool-like valve 86 which constantly is urged outwardly into seating engagement with the inner end of the plug 55' by a light coil spring 87; that said valve 86 is provided with a bore 88 opening through its ends and which registers with the bore 82 of the plug 55', and that within said bore 88 is a check valve 89 which is maintained normally closed by a spring 90 and which permits flow of liquid from the inner end of the bore 52' into the bores 88 and 82 and consequently to the reservoir 17 under certain conditions when the valve 86 is closed or, in other words, when said valve 86 is sealed against the inner end of the plug 55', but which denies reverse flow of the liquid.

The Figs. 6 and 7 embodiment of the invention operates as follows: As "compression above normal" takes place; i. e., upon movement of the piston 11 and the head 15 toward each other the liquid below the piston within the chamber $b$ is subjected to pressure and obviously is prevented from escaping through the valve B' because this valve is a one-way valve denying flow of liquid from the chamber $b$ to the passageway 16. Therefore, the only avenues of escape for the liquid are through the valves A' and D. The strength of the spring 90 maintaining the ball check valve 89 normally closed is such that the pressure required to open said check valve 89 is above the maximum operating pressure of the valve A'. Consequently, check valve 89 remains closed under normal conditions and valve A' opens, permitting a metered flow of the liquid from the chamber $b$ through the duct 31' into the passageway 16 and thence to the space $a$ above the piston. However, if, for any reason, the movement of the piston 11 is very sudden, resulting in the building up of an excessively high pressure in the chamber $b$, the valve 89 may open to relieve such pressure and thus cushion the shock. Since more liquid is discharged from the chamber $b$ than can be accommodated by the chamber $a$ there comes a time during downward movement of the piston when the liquid below the same, unless released, would constitute a solid abutment preventing further downward movement of the piston. However, before this condition is encountered the pressure generated results in opening of the check valve 89 with consequent discharge of the excess liquid into the reservoir.

As "rebound above normal" takes place; i. e., upon upward movement of the piston following the "compression above normal" period of operation just recounted, the liquid above the piston is subjected to pressure and flows from the chamber $a$ through the ports 81 to the duct 51 and through the valve B and thence to the chamber $b$ at the bottom of the cylinder 10 as in the Figs. 1 to 5 embodiment of the invention. Since the chamber $a$ is of less capacity than the chamber $b$, not enough liquid is forced from the chamber $a$ to fill the chamber $b$. Consequently, the valve 86 is drawn open against the light spring 87 and liquid in an amount to fill the chamber $b$ is drawn from the reservoir 17 through the duct 85 and through the bore 82 of the plug 55' around the valve 86 which loosely fits the bore 52'.

As "rebound below normal" takes place; i. e., upon upward movement of the piston from its normal position, the operation is as recounted in connection with the Figs. 1 to 5 embodiment of the invention and as just recounted in connection with the "rebound above normal" phase of operation. On the other hand, as "compression below normal" takes place; i. e., upon downward movement of the piston following the "rebound below normal" phase of operation, the operation is the same as recounted in connection with the Figs. 1 to 5 embodiment of the invention and as just set forth in connection with the "compression above normal" phase of operation.

From the foregoing description considered in connection with the drawings it is thought that the construction and operation of the present shock absorber will be clearly understood and that the advantages thereof will be appreciated. However, it is desired to emphasize that all valves are readily and easily removable for adjustment, cleaning, replacement or for any other reason, individually and without in any way requiring dis-assembly of any other part or parts of the shock absorber; that a liquid storage reservoir of exceptionally large capacity is provided affording all necessary air and liquid space so that the necessity of any breather valve for said reservoir is avoided; that the spool valves are duplicates of one another and may be used interchangeably, which is of decided advantage from an economical production standpoint, and that the general construction is simple and rugged and embodies parts which are strong and durable and which are not likely to become broken or damaged or to get out of order.

While only certain specific embodiments of the invention have been illustrated and described, it is apparent that the invention may be embodied in specifically different mechanical structures within the spirit and scope of the invention as defined in the appended claims.

I claim:—

1. A hydraulic shock absorber comprising a cylinder, a piston reciprocal within said cylinder and having a normal position between the ends thereof dividing the cylinder into separate pressure chambers, a tube surrounding the cylinder in spaced relationship thereto to provide a liquid passageway, a casing surrounding the tube in spaced relationship thereto to provide a liquid reservoir, heads closing the ends of said cylinder, tube and casing, a piston rod extending from the piston through one of said chambers and one of said heads, and valves controlling flow of liquid between the chambers through said passageway and between the chambers and said reservoir.

2. A hydraulic shock absorber comprising a cylinder, a piston reciprocal within said cylinder and having a normal position between the ends thereof dividing the cylinder into separate pressure chambers, a tube surrounding the cylinder in spaced relationship thereto to provide a liquid passageway, a casing surrounding the tube in spaced relationship thereto to provide a liquid reservoir, heads closing the ends of said cylinder, tube and casing, a piston rod extending from the piston through one of said chambers and one of said heads, said cylinder having an opening intermediate its ends which is closed by said piston when the latter is in its normal position and which is uncovered when the piston is moved into either pressure chamber to afford direct communication between said passageway and the other pressure chamber, and valves controlling flow of liquid between the chambers through said passageway and opening and between the chambers and said reservoir.

3. A hydraulic shock absorber as set forth in claim 1 in which all of the liquid control valves are carried by said heads and are individually removable without requiring disassembly of the heads from the cylinder, tube and casing.

4. A hydraulic shock absorber as set forth in claim 2 in which all of the liquid control valves are carried by said heads and are individually removable without requiring disassembly of the heads from the cylinder, tube and casing.

5. A hydraulic shock absorber as set forth in claim 1 in which the head having the piston rod extending therethrough is provided with a chamber for the collection of any liquid which may leak along said piston rod, and in which a duct in said head provides communication between said liquid collection chamber and the liquid reservoir.

6. A shock absorber as set forth in claim 2 in which the head having the piston rod extending therethrough is provided with a chamber for the collection of any liquid which may leak along said piston rod, and in which a duct in said head provides communication between said liquid collection chamber and the liquid reservoir.

7. A hydraulic shock absorber comprising a cylinder, a piston reciprocal within said cylinder and having a normal position between the ends thereof dividing the cylinder into separate pressure chambers, a tube surrounding the cylinder in spaced relationship thereto to provide a liquid passageway, a casing surrounding said tube in spaced relationship thereto to provide a liquid reservoir, heads closing the ends of said cylinder, tube and casing, a piston rod extending from said piston through one of said chambers and one of said heads, the cylinder having an opening intermediate its ends which is closed by said piston when the latter is in its normal position and which is uncovered when the piston is moved into either pressure chamber to afford direct communication between said passageway and the other pressure chamber, a check valve within one of said heads operable upon movement of the piston from its normal position into one of said pressure chambers to permit flow of the liquid from said pressure chamber into the other pressure chamber and to prevent reverse flow of the liquid, and a second valve within the same head controlling flow of liquid from said first mentioned pressure chamber into said reservoir.

8. A hydraulic shock absorber as set forth in claim 7 in which the second mentioned valve is constructed to operate under a rising pressure in the first mentioned pressure chamber to progressively retard flow of liquid from said chamber into the reservoir.

9. A hydraulic shock absorber as set forth in claim 7 including a second check valve within the same head as said first check valve permitting flow of liquid from the reservoir into the first mentioned chamber, and a fourth valve within the same head operable upon return movement of the piston from the first mentioned pressure chamber to its normal position to control flow of liquid from the second mentioned chamber through the passageway to the first mentioned chamber, said fourth valve being operable under a rising pressure in the second mentioned chamber to progressively retard flow of liquid from the second mentioned pressure chamber to the first mentioned chamber.

10. A hydraulic shock absorber as set forth in claim 7 in which the second mentioned valve is operable as a check valve to permit flow of liquid from the first mentioned pressure chamber to the reservoir and to prevent reverse flow of the liquid, and in which said second mentioned valve is constructed to operate under a rising pressure in the first mentioned pressure chamber to progressively retard flow of the liquid from said chamber into the reservoir.

11. A hydraulic shock absorber as set forth in claim 7 including a second check valve within the same head as the first check valve permitting flow of liquid from the reservoir into the first mentioned chamber, and a fourth valve within the same head operable upon return movement of the piston from the first mentioned pressure chamber to its normal position and under a rising pressure in the second mentioned pressure chamber to progressively retard flow of liquid from the latter pressure chamber to the first mentioned pressure chamber, said fourth valve being operable to permit flow of liquid from the second mentioned pressure chamber to the first mentioned pressure chamber and to prevent reverse flow of the liquid.

12. A hydraulic shock absorber comprising a cylinder, a piston reciprocal within said cylinder and having a normal position between the ends thereof dividing the cylinder into separate pressure chambers, the cylinder having an opening, means providing a passageway which, in conjunction with said opening, affords communication between said pressure chambers when the piston is moved in either direction from its normal position, means providing a liquid reservoir, a liquid metering valve controlling flow of liquid from one of the pressure chambers to the other, a second liquid metering valve controlling flow of liquid from the second mentioned pressure chamber to the first mentioned pressure chamber, and a single-unit, double check valve controlling flow of liquid in both directions between one of said pressure chambers and said reservoir.

13. A hydraulic shock absorber comprising a cylinder, a piston reciprocal within said cylinder and having a normal position between the ends thereof dividing the cylinder into separate pressure chambers, the cylinder having an opening, means providing a passageway which, in conjunction with said opening, affords communication between said pressure chambers when the piston is moved in either direction from its normal position, means providing a liquid reservoir, a liquid metering valve controlling flow of liquid from one of the pressure chambers to the other, a second liquid metering valve controlling flow of liquid from the second mentioned pressure chamber to the first mentioned pressure chamber, and a single-unit, double check valve controlling flow of liquid in both directions between one of said pressure chambers and said reservoir, said single-unit valve comprising a hollow member slidably mounted to close under the influence of pressure generated in one of the pressure chambers to prevent escape of liquid from said pressure chamber to the reservoir, and a check valve within said hollow member permitting flow of liquid therethrough to the reservoir and denying reverse flow of the liquid.

14. A hydraulic shock absorber comprising a cylinder, a piston reciprocal within said cylinder and having a normal position between the ends thereof dividing the cylinder into separate pressure chambers, the cylinder having an opening, means providing a passageway which, in conjunction with said opening, affords communication between said pressure chambers when the piston is moved in either direction from its normal position, means providing a liquid reservoir, liquid metering valve means controlling flow of liquid from each pressure chamber to the other pressure chamber, and a single-unit double check valve permitting substantially free flow of liquid from the reservoir to one of the pressure chambers and permitting flow of liquid from the same pressure chamber to the reservoir only under a pressure in excess of the maximum operating pressure of said metering valve means.

15. A hydraulic shock absorber comprising a cylinder, a piston reciprocal within said cylinder and having a normal position between the ends thereof dividing the cylinder into separate pressure chambers, the cylinder having an opening, means providing a passageway which, in conjunction with said opening, affords communication between said pressure chambers when the piston is moved in either direction from its normal position, means providing a liquid reservoir, liquid metering valve means controlling flow of liquid from each pressure chamber to the other pressure chamber, and a single-unit double check valve permitting substantially free flow of liquid from the reservoir to one of the pressure chambers and permitting flow of liquid from the same pressure chamber to the reservoir only under a pressure in excess of the maximum operating pressure of said metering valve means, said single-unit valve comprising a member slidably mounted to close under the influence of pressure generated in the last mentioned pressure chamber thereby to prevent flow of liquid under relatively low pressure from said last mentioned pressure chamber to the reservoir, said member having a duct extending therethrough, a check valve denying flow of liquid through said duct from the reservoir to the last mentioned pressure chamber and permitting reverse flow of the liquid, and a spring maintaining said check valve closed except under pressure in excess of the maximum operating pressure of said metering valve means.

16. A hydraulic shock absorber comprising a cylinder, a piston within said cylinder and having a normal position between the ends thereof dividing the cylinder into separate pressure chambers, heads closing the ends of said cylinder, a piston rod extending from said piston through one of said heads, means providing a chamber into which liquid and air escaping along said piston rod may collect, means preventing escape of liquid from said chamber along that portion of the piston rod disposed outwardly of said chamber, said piston rod inwardly of said chamber extending loosely through the head so that liquid and air in relatively small amounts may escape to said chamber, a liquid reservoir, means providing communication between said chamber and said reservoir, said chamber being devoid of communication with the cylinder except through the clearance space between the piston rod and the head through which said rod extends, and valve means controlling flow of liquid between the pressure chambers and between the latter and said reservoir.

NEVIN S. FOCHT.